Figure 1:
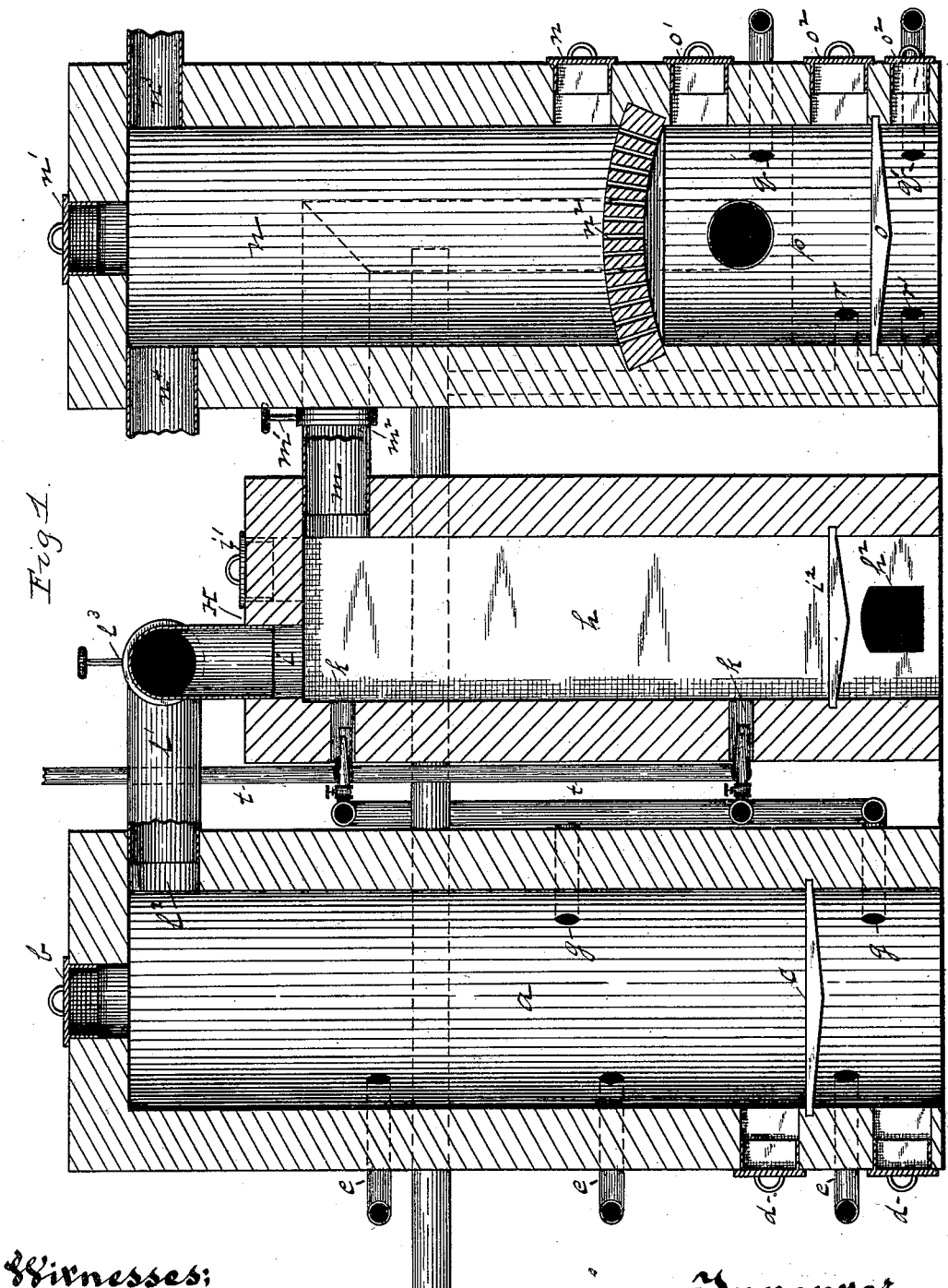

(No Model.) 2 Sheets—Sheet 1.

J. M. ROSE.
PROCESS OF MANUFACTURING GAS.

No. 403,382. Patented May 14, 1889.

(No Model.) 2 Sheets—Sheet 2.
J. M. ROSE.
PROCESS OF MANUFACTURING GAS.

No. 403,382. Patented May 14, 1889.

Witnesses:
J. M. Cooke
N. S. Stockwell

Inventor.
James M. Rose
By James I. Kay
Attorneys

UNITED STATES PATENT OFFICE.

JAMES M. ROSE, OF ALLEGHENY, PENNSYLVANIA, ASSIGNOR, BY MESNE ASSIGNMENTS, TO THE NATIONAL HEAT AND POWER COMPANY, OF NEW JERSEY.

PROCESS OF MANUFACTURING GAS.

SPECIFICATION forming part of Letters Patent No. 403,382, dated May 14, 1889.

Application filed February 23, 1888. Serial No. 264,983. (No model.)

*To all whom it may concern:*

Be it known that I, JAMES M. ROSE, a resident of Allegheny, in the county of Allegheny and State of Pennsylvania, have invented a new and useful Improvement in the Process of Manufacturing Gas; and I do hereby declare the following to be a full, clear, and exact description thereof.

My invention relates to the manufacture of water-gas, and more especially to an improvement in the method described in an application for patent filed by me March 2, 1887, Serial No. 229,435.

In the method described in the above application a mass of limestone or other porous material which is impregnated with a heavy hydrocarbon is subjected, while inclosed in an air-tight chamber, to the action of water-gas and steam, the mass of limestone being preferably heated by the waste products of combustion coming from the water-gas generator, and when the fuel in the same is blown up to incandescence steam is admitted thereto for the purpose of making the water-gas, and the nascent hydrogen of the water-gas in passing through the heated impregnated limestone is taken up by the heavy hydrocarbon—such as asphaltum or coal-tar—held in suspension by the limestone, so forming a large proportion of marsh-gas and olefiant gas, the resultant gas being formed of marsh-gas, hydrogen gas, olefiant gas, and carbonic oxide, and the advantage of the process being that a large proportion of this marsh-gas and olefiant gas is obtained at a low cost by the union of the hydrogen with the heavy hydrocarbon. In said process as described the limestone or other suitable material is first coated with the heavy hydrocarbon and then introduced into said chamber, and as the process continues it is evident that the hydrocarbon so held in suspension by the refractory material will gradually become exhausted, and it is desirable to maintain the coating of this refractory material without the necessity of withdrawing the same from the chamber in which it is contained, this being one of the objects of my invention. It is also found desirable, after the products of combustion have been employed to heat this refractory material, to further heat a mass of fixing material by the burning of said products of combustion, and in so doing it is found desirable to increase the proportion of combustible gases in said products of combustion before burning the same to heat the refractory material and for other purposes.

To these ends my invention consists, generally stated, in raising a mass of coal or coke to incandescence, passing the products of combustion therefrom through a mass of refractory material, and during their passage introducing liquid or solid hydrocarbons into said products and said refractory material in such quantity as to coat the refractory material, and after the passage through the same burning said products and the resultant hydrocarbon vapors to heat a body of fixing material, and subsequently passing steam into said mass of incandescent fuel and the gases formed through said refractory material and the heated fixing material.

My invention also consists in certain sub-processes in connection with the main or complete process, as hereinafter more fully set forth.

To enable others skilled in the art to practice my invention, I will describe the same more fully, referring to accompanying drawings, in which—

Figure 2:
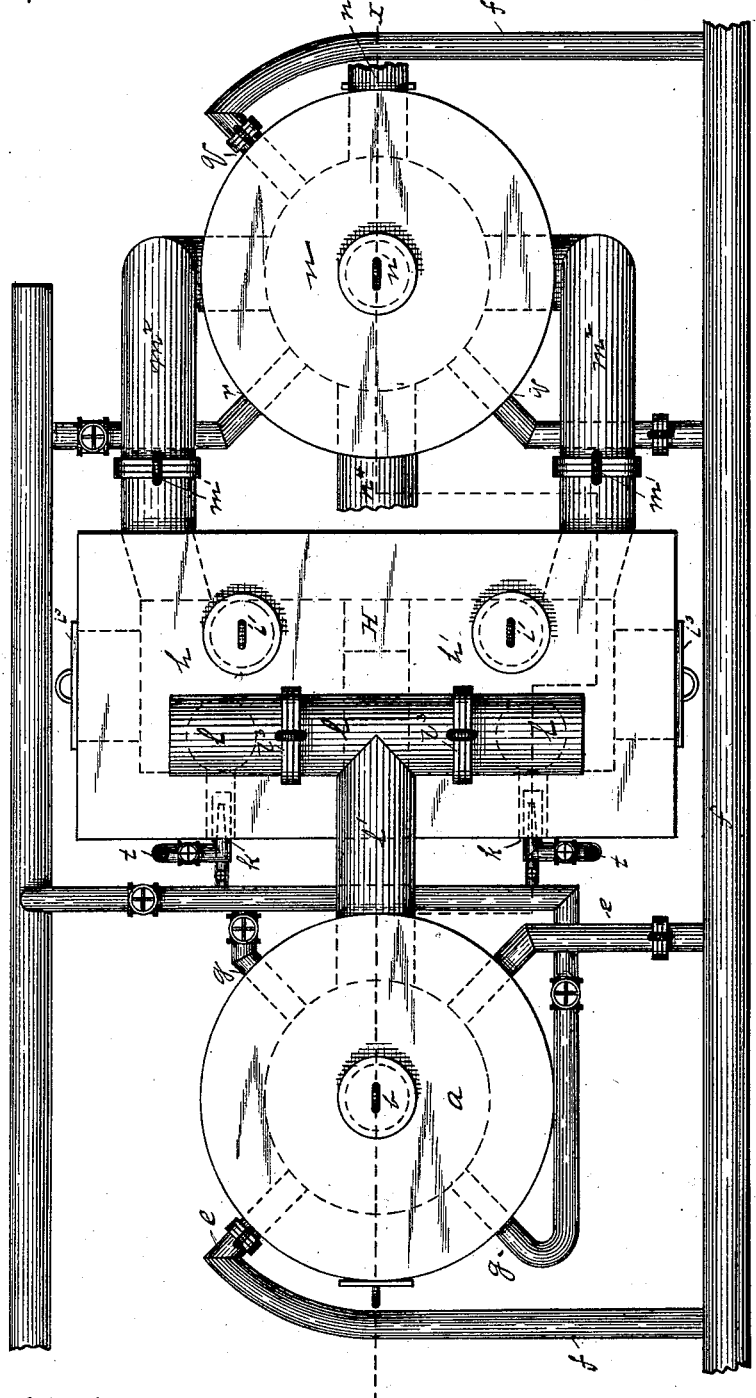

Figure 1 is a longitudinal section on the line *x x*, Fig. 2; and Fig. 2 is a top or plan view of an apparatus suitable for practicing my invention.

In carrying out my invention the form of apparatus described by me in said application filed March 2, 1887, Serial No. 229,435, or that set forth in the application filed by me on the 23d day of January, 1888, Serial No. 261,693, or other apparatus suitable for the purposes, may be employed, my invention being described in connection with the apparatus described in said application filed by me on the 23d day of January, 1888. This apparatus, illustrated in the drawings, consists, generally stated, in a generator-chamber, a double limestone-chamber or hydrocarbon-generator containing a mass of limestone or other refractory material, the two compartments of which are connected to said generator-chamber and with each other, and a combined generating and fixing chamber connected to each compartment of the limestone-chamber. The generator-chamber $a$ is provided with a charging port or ports, $b$, in the top or roof thereof, for the charging of the coal or other carbonaceous fuel therein, grate-bars $c$ near the base thereof, for the support of said carbon, discharging outlets or doors $d$, both above or below said grate-bars, for the withdrawal of the ashes, and a series of air-inlet pipes, $e$, both above and below the grate-bars, for the entrance of the air-blast employed in raising the fuel in this chamber to incandescence, these air-inlets being supplied by a suitable air-main, $f$, leading from the blower or fan. The generator-chamber $a$ is also provided with one or more steam-inlet pipes or nozzles, $g$, preferably on opposite sides, for the admission of steam into the chamber to make water-gas when the fuel has become incandescent. Contiguous to this generator-chamber, and preferably in front of the same, is placed the double chamber H, having two compartments, $h\ h'$, placed side by side, and each of said compartments is provided with a gas-inlet, $i$, preferably on the top thereof, with charging-ports $i'$, also on the top, for the charging into the compartment of the limestone or other refractory material, the grate-bars $i^2$ near the base, for the support of said material, and discharging-doors $i^3$ on the side, for the discharge of the same. These compartments $h\ h'$ are also each provided with steam-inlets $k$, preferably near the top and above the grate-bars, for the admission of steam therein at the proper time, these inlets being preferably in the form of an injector, which has a connection through a pipe, $t$, with a tank (not shown) containing liquid hydrocarbon. The gas-inlet $i$ of each compartment is connected to a suitable cross-pipe, $l$, which is itself connected by a pipe, $l'$, with a gas-outlet, $l^2$, in the upper part of the generator-chamber $a$, these connections between the generator-chamber and the limestone-chamber being provided with suitable valves, $l^3$, so that the products of combustion and gases coming from the generator-chamber $a$ may be carried into either compartment $h$ or $h'$.

The compartments $h\ h'$ are connected together at their lower part, preferably below the grate-bars, by a flue or passage, $h^2$, to permit the flow of fluids from one to the other, as hereinafter set forth, the compartments being also provided with suitable outlets, $m$, controlled by suitable valves, $m'$, for the escape of the gases therefrom. By this arrangement of the compartments of the limestone-chamber the products of the combustion and gases formed in the generator can be compelled to pass down through one or the other compartment, and thence up through the other compartment, so heating the material therein, and finally through the outlet $m$ of that compartment to the combined generating and fixing chamber $n$, and the course of the products of combustion and gases formed can then be reversed, passing in the opposite direction through said compartments, so that all the heat is absorbed from the products of combustion while they are passing through the two compartments of the limestone-chamber, on account of the large amount of surface exposed to them, while at the same time the mass of limestone or refractory material contained in these chambers can be maintained at a substantially even heat, which is very desirable, as hereinafter more fully set forth.

The third chamber, $n$, in the apparatus is placed in front of the double chamber H and contiguous thereto, this chamber being employed for the purposes of assisting the draft through the refractory material in the double chamber, utilizing the waste products and hydrocarbon vapors discharged from said chamber in heating the refractory material, generating a further proportion of hydrogen and carbonic oxide, and fixing all the gases obtained. The chamber is provided with the charging-port $n'$ in the roof, for the charging of the fixing materials therein, a perforated arch, $n^2$, for the support of the fixing material, and gas-outlets $n^3\ n^4$, the one for the escape of the products of combustion and the other to carry the gases formed to the holder. It is also provided with grate-bars $o$ near the base, for the support of the mass or bed of coal or other carbonaceous fuel, for the purpose hereinafter described, the chamber having, for the purpose of withdrawing the charge of fixing material, an outlet or door, $n^5$, above the arch $n^2$ and similar outlets, $o'\ o^2$, above and below the grate-bars, for the charge of fuel on said grate-bars and the withdrawal of ashes from the chamber. The space above the bed of fuel on the grate-bars and below the arch $n^2$ forms a mixing-chamber, $p$, in which the gases coming from the limestone-chambers and those generated from the bed of fuel on the grate-bars $o$ are intermingled. Leading from each compartment $h\ h'$ of the double chamber H are the pipes $m^2$, which communicate with the mixing-chamber $p$ above the grate-bars $o$, so carrying any waste products or gases from the said compartments $h\ h'$ into the chamber $p$ above the bed of fuel.

To supply the necessary air to mix with the products of combustion and hydrocarbon vapors as they come over from the limestone-chamber to insure the combustion of the same, one or more inlets, $q$, are arranged in the chamber $p$ above the grate-bars $o$ and below the arch $n^2$, and one or more air-inlets, $q'$, are arranged below the grate-bars to supply air for the burning of the fire on said bars, both inlets being connected with the blast-pipe $f$. Suitable steam-supply pipes or inlets, $r\ r'$, are also connected with the chamber $n$ above and below the grate-bars.

In practicing my improved process of making gas the chamber $a$ is filled with coal or coke or other suitable carbon and the chamber H is filled with limestone, dolomite, or other suitable porous material, which is described under the general term of "refractory material," and this refractory material is preferably coated with a heavy hydrocarbon—such as asphaltum or coal-tar—before it is introduced into the chamber H, though it is not absolutely necessary to coat the refractory material before its introduction into this chamber. The pipe $t$ communicates with a tank containing a liquid hydrocarbon, such as crude petroleum. The chamber $n$ is preferably provided with a bed of coals on the grate-bars $o$, and above the perforated arch $n^2$ is a mass of fixing material, such as limestone or dolomite. The air-blast is then turned into the gas-generator $a$, the products of combustion therefrom passing through the chamber H, containing the refractory material, and thence passing into the chamber $n$, the bed of coal on the grate-bars $o$ having been also ignited, where said bed of coal is employed, and the products of combustion being burned in said mixing-chamber $p$, a suitable supply of air being admitted above and below the grate $o$ for this purpose, and the heated products formed by the combustion of said products rising through the fixing material to heat the same. During the passage of the products of combustion through the chamber H, I introduce liquid or solid hydrocarbon into said products through the pipe $t$, a liquid hydrocarbon—such as crude petroleum—being preferably employed, and this liquid hydrocarbon being preferably sprayed into said chamber with steam, in order to spread the same over and throughout the mass of refractory material contained in said chamber, though the liquid hydrocarbon may be pumped into the chamber. The heated products of combustion will of course vaporize the lighter portions of the liquid hydrocarbon, these portions passing off to be burned with the products of combustion from the gas-generator $a$, while the heavier parts of the liquid hydrocarbon will be distributed over the refractory material contained in the chamber, and serve to further coat the same, and so form a coating of heavy hydrocarbon on the surface of the refractory material and an impregnating of the mass thereof or a refreshening of the coating of said refractory material where the same has been coated with the heavy hydrocarbons before its introduction into said chamber. This introduction of hydrocarbon into the products of combustion and the refractory material thus serves to maintain a suitable coating of the refractory material and provides a body of heavy hydrocarbons supported by the refractory material to be taken up by the nascent hydrogen in the gas-making process, as hereinafter described. As in the apparatus shown a double chamber for the refractory material is employed, where this liquid hydrocarbon is thus introduced with the products of combustion alternately into two compartments of the chamber H on the top of the refractory material or into the mass of the same, the proper and even coating of this refractory material with heavy hydrocarbons deposited from the liquid hydrocarbons introduced can be continuously maintained. At the same time this liquid hydrocarbon adds to the products of combustion a light hydrocarbon vapor, which, as it passes from said chamber H, can be burned within the chamber $n$ to heat the fixing material contained therein, and substantially all the heat-units from the coal being employed. The proportion of liquid hydrocarbon introduced into the refractory material with the products of combustion, as above set forth, is regulated according to the amount required to obtain the impregnation of the mass of refractory material and the heat necessary in heating the fixing material or generating the steam necessary for the process.

When the coal or other carbonaceous materials in the generator are raised to the desired incandescence, the air-supply is cut off and the purge-valve $n^4$, through which the products of combustion have been permitted to escape from the apparatus, is closed, and the valve $n^3$, communicating with the gas-holder, opened. Steam is then admitted to the gas-generator $a$, and, passing up through the mass of incandescent material therein, it is decomposed into hydrogen and carbonic oxide, the gases passing over into the chamber H and through the mass of coated refractory material therein, the nascent hydrogen uniting with the heavy hydrocarbon held in suspension by said refractory material and forming a light hydrocarbon gas, principally marsh-gas and olefiant gas; and then, if desired, during the gas-making process a suitable solvent for the heavy hydrocarbon—such as alcohol or wood spirits—may be introduced into said refractory material, as described in the application for patent filed by me on the 18th day of January, 1888, Serial No. 261,139. The gas so obtained consists of hydrogen, carbonic oxide, marsh-gas, and olefiant gas, and these gases may be fixed by passing them through a heated fixing material, as before described. Where the resultant gas is to be employed for illuminating purposes, as described in an application of even date herewith, the steam may also be admitted to the chamber $n$ below the grate-bars $o$, this steam being decomposed by the incandescent fuel on said grate-bars, and the gases rising from the same being intermingled with the gases from the chamber H and passing with the same through the heated fixing material, so forming an illuminating-gas of high candle-power. In making fuel-gas, however, this addition of hydrogen and carbonic oxide is not required, and the gases passing from the chamber H may be passed directly to the gas-holder. As soon as the heat of the coal in the generator $a$ is lowered so that it will not decompose the steam the steam-supply is cut off from said chamber and air is again introduced to the same and the process of raising the coal and refractory material to the desired heat repeated, the liquid hydrocarbon being again introduced, and where the apparatus shown is employed, the liquid hydrocarbon being preferably introduced into the other compartment of the chamber H, the course of the products of combustion through the same being reversed.

By my improved process I am enabled to make a gas, either for fuel or illuminating purposes, as the case may be, at a comparatively low cost, the gas having a high heating or illuminating power, and I am enabled to employ the process continuously without the necessity of removing the refractory material from the apparatus and recoating the same, and at the same time I am enabled to utilize all the heat-units of the fuel employed in forming the water-gas.

Practical use of my invention has demonstrated the fact that the fuel-gas obtained is of exceedingly fine quality, its heating-powers being much greater than the natural gas which is obtained in some localities in this country.

What I claim as my invention, and desire to secure by Letters Patent, is—

1. The herein-described process of manufacturing gas, consisting in raising a mass of coal or coke to incandescence, passing the products of combustion therefrom through a mass of refractory material and during their passage introducing liquid or solid hydrocarbons into said products and said refractory material in such quantity as to coat the refractory material, and burning the said products and the resultant hydrocarbon vapors to heat a body of fixing material, and subsequently passing steam into said mass of incandescent carbon and the gases formed through said coated refractory material and said heated fixing material, substantially as and for the purposes set forth.

2. The herein-described steps in the manufacture of gas, consisting in raising a mass of coal or coke to incandescence, passing the products of combustion therefrom through a mass of refractory material and during their passage introducing solid or liquid hydrocarbons into said products and said refractory material in such quantity as to coat the refractory material, and burning said products and the resultant hydrocarbon vapors to heat a body of fixing material, substantially as and for the purpose set forth.

In testimony whereof I, the said JAMES M. ROSE, have hereunto set my hand.

JAMES M. ROSE.

Witnesses:
RICHD. S. CHILD, Jr.,
ABNER J. DAVIS.